US012663057B2

(12) United States Patent
Adkins et al.

(10) Patent No.: US 12,663,057 B2
(45) Date of Patent: Jun. 23, 2026

(54) COMPOSITE GEAR

(71) Applicant: ROLLS-ROYCE plc, London (GB)

(72) Inventors: Russell Adkins, Derby (GB); Mark Spruce, Derby (GB); Richard Greaves, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 19/220,212

(22) Filed: May 28, 2025

(65) Prior Publication Data

US 2025/0383011 A1 Dec. 18, 2025

(30) Foreign Application Priority Data

Jun. 14, 2024 (GB) ...................................... 2408516

(51) Int. Cl.
 *F16H 55/17* (2006.01)
 *F16H 1/28* (2006.01)
(52) U.S. Cl.
 CPC ..................................... *F16H 1/28* (2013.01)
(58) Field of Classification Search
 CPC ....... F16H 2055/17; F16H 55/06; F16H 55/17
 See application file for complete search history.

(56) References Cited

U.S. PATENT DOCUMENTS

| | | | | |
|---|---|---|---|---|
| 1,601,911 | A | * | 10/1926 | Godfrey .................. B29C 70/20 264/258 |
| 1,708,166 | A | | 4/1929 | Adams |

| | | | | |
|---|---|---|---|---|
| 3,200,665 | A | | 8/1965 | Wells |
| 9,296,157 | B1 | * | 3/2016 | Handschuh ............. F16H 55/06 |
| 2003/0166377 | A1 | | 9/2003 | Schmid |
| 2020/0191250 | A1 | | 6/2020 | Dewhirst et al. |
| 2021/0062906 | A1 | * | 3/2021 | Mauerlechner ......... F16H 55/12 |
| 2023/0383833 | A1 | | 11/2023 | Ananda et al. |

FOREIGN PATENT DOCUMENTS

| | | | | | |
|---|---|---|---|---|---|
| CN | 113007310 | A | * | 6/2021 | ............. F16H 55/06 |
| DE | 102014113294 | A1 | * | 3/2016 | ............. B29D 15/00 |
| GB | 2562610 | A | | 11/2018 | |
| GB | 2583539 | A | | 11/2020 | |

OTHER PUBLICATIONS

Great Britain search report dated Dec. 12, 2024, issued in GB Patent Application No. 2408516.9.
European search report dated Sep. 16, 2025, issued in EP Patent Application No. 25176554.1.

* cited by examiner

*Primary Examiner* — Stacey A Fluhart

(57) ABSTRACT

A composite gear includes an annular metallic gear hub including a bore and defining a central axis. The composite gear includes a composite web disposed circumferentially around the annular metallic gear hub with respect to the central axis. It includes a metallic gear rim disposed circumferentially around the composite web with respect to the central axis. The metallic gear rim includes an annular portion disposed adjacent to the composite web and a plurality of gear teeth angularly spaced apart from each other and extending outwardly from the annular portion distal to the composite web. The composite gear includes an interface disposed between the metallic gear rim and the composite web. The composite web includes a plurality of fibres inclined against each other by an angle from 30 to 60 degrees in order to form a mesh or woven fabric.

19 Claims, 10 Drawing Sheets

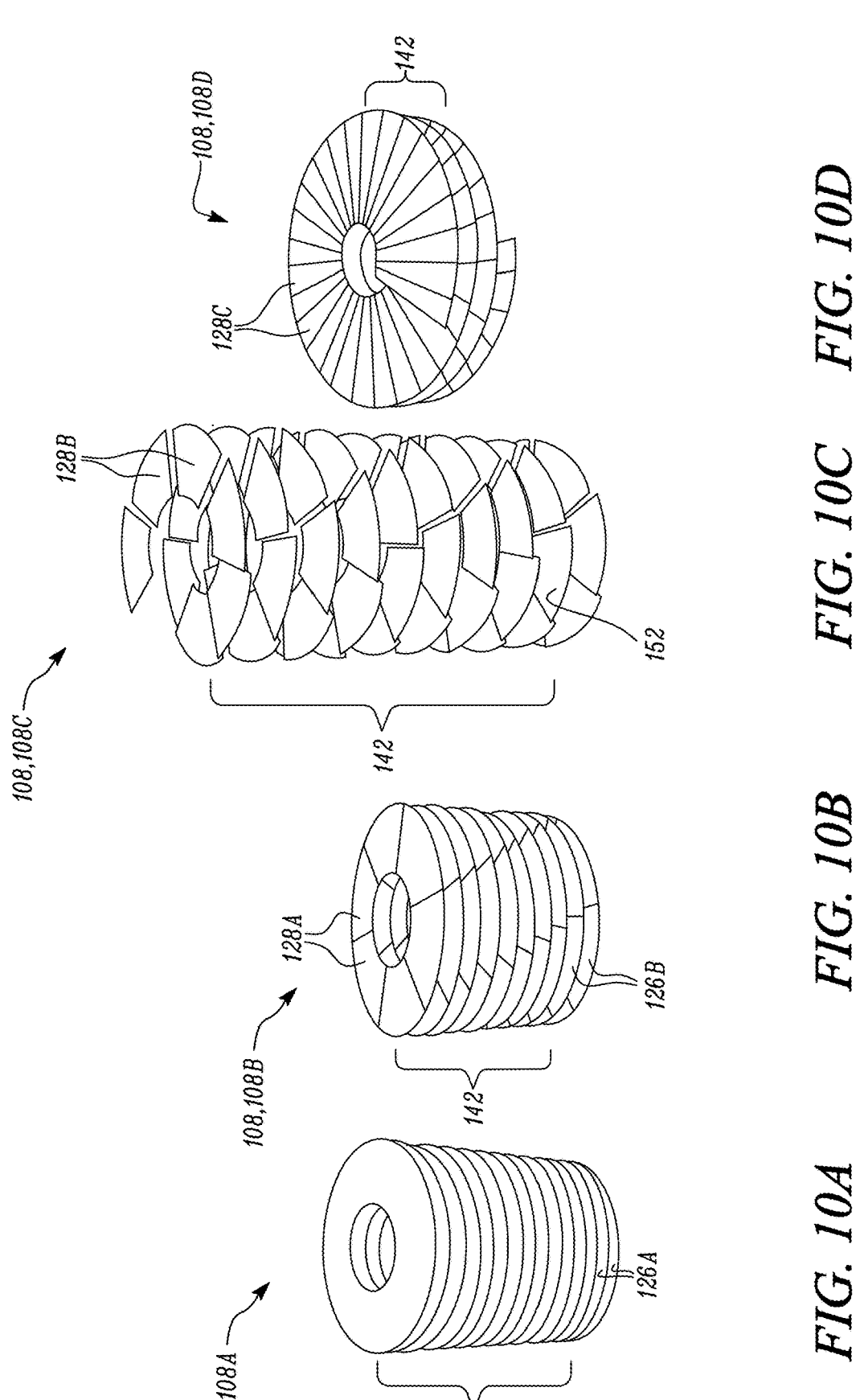
*FIG. 10A*        *FIG. 10B*        *FIG. 10C*        *FIG. 10D*

COMPOSITE GEAR

CROSS-REFERENCE TO RELATED APPLICATIONS

This specification is based upon and claims the benefit of priority from United Kingdom patent application number GB 2408516.9 filed on Jun. 14, 2024, the entire contents of which is incorporated herein by reference.

BACKGROUND

Technical Field

This disclosure relates to a composite gear and a method of manufacturing the composite gear.

Description of the Related Art

In gear industries, a gear tooth flank correction is well known for achieving optimal performance, long service life and high reliability of gear systems, especially used in high power applications, such as in gas turbine engines. The gear tooth flank correction involves making a localised shape change along a flank of a gear tooth. The aforesaid shaping compensates for load concentrations at edges of the gear teeth and/or uneven load distribution within mating gears of the gear systems.

Conventional methods of the gear tooth flank correction involve shaping the gear tooth in a linear taper, a barreled form or a combination of the linear taper and barreled form, running along a face of the gear tooth. The aforesaid correction on the existing form of the gear tooth backs the gear tooth off from the meshing gear tooth. This may reduce a tooth contact pressure and thereby may reduce a strain in a root radius of the gear tooth, where otherwise concentrated load conditions would occur.

However, for aforesaid shaping of the gear tooth, an accurate machining technique may be essential that may preclude the use of more cost effective machine tools and machining methods. Furthermore, such shaping imparts a permanent geometric form to the gear tooth and thereby the aforesaid gear tooth flank correction may be defined for a particular use case only. This may limit an effectiveness of the gear system in other use cases. As an example, the gear tooth flank correction for a gas turbine engine may provide either a lead correction to suit a high power, short duration take-off condition or a lead correction to suit a lower power, long duration cruise condition.

Thus, there exists a need for a system and method that may minimize or eliminate a need for the gear tooth flank correction.

SUMMARY

In a first aspect, there is provided a composite gear. The composite gear includes an annular metallic gear hub. The annular metallic gear hub includes a bore and defines a central axis of the composite gear. The composite gear further includes a composite web disposed circumferentially around the annular metallic gear hub with respect to the central axis. The composite web includes a plurality of fibres. The composite web has a composite axial length. The composite gear further includes a metallic gear rim disposed circumferentially around the composite web with respect to the central axis. The metallic gear rim includes an annular portion disposed adjacent to the composite web. The metallic gear rim further includes a plurality of gear teeth angularly spaced apart from each other with respect to the central axis and extending outwardly from the annular portion distal to the composite web. The composite gear further includes an interface disposed between the metallic gear rim and the composite web. The metallic gear rim at least partially engages with the composite web at the interface. The interface extends from a first axial end to a second axial end along an axial length of the composite gear with respect to the central axis. The plurality of fibres includes a set of first fibres. The plurality of fibres further includes a set of second fibres intersecting with the set of first fibres and inclined to the set of first fibres by an inclination angle from 30 degrees to 60 degrees, such that the set of first fibres and the set of second fibres together form a mesh or a woven fabric. Such an orientation of the plurality of fibres may reduce a stiffness of the composite web. The woven fabric may include a woven mat form including a warp and weft fibres.

The composite gear may provide an improved compliance to minimize a need for any gear tooth flank correction. A defined variation in an interface pressure and stiffness of the composite web underneath the metallic rim and along the axial length of the composite gear may increase the compliance in each gear tooth at predefined locations. The increased compliance may locally reduce the gear tooth contact pressure and thereby may replicate on the composite gear. This may provide similar effects of the gear tooth flank correction. Specifically, a pressure at the interface between the composite web and the metallic gear rim combined with the stiffness of the composite web may provide a significant contribution to a bending stiffness of the metallic gear rim. A less stiffly supported metallic gear rim may provide the gear teeth more compliance under an application of a load. More compliance may reduce the gear tooth contact pressure and a resulting strain in a root radius of the composite gear. Since, the gear tooth flank correction may be no longer required, the composite gear may be manufactured using more cost-effective machine tools and machining methods.

The composite gear may be manufactured with an improved compliance and may have a reduced manufacturing cost. Further, as the composite gear may have the improved compliance without permanent alterations to the gear teeth for a particular use condition, the composite gear may be used effectively over varying use conditions.

In addition, the composite gear including the composite web may have a reduced mass as compared to a metallic gear.

In some embodiments, the inclination angle is from 35 degrees to 55 degrees, or from 40 degrees to 50 degrees, or is 45 degrees.

In some embodiments, each of the plurality of fibres extends radially with respect to the central axis. Such an orientation of the plurality of fibres may provide a greater stiffness to the composite web.

In some embodiments, the plurality of fibres is randomly arranged in the composite web.

In some embodiments, the random arrangement of the plurality of fibres within the composite web may have a random chopped strand construction. The random arrangement of the plurality of fibres may reduce a stiffness of the composite web.

An orientation of the plurality of fibres may help to alter a stiffness of the composite web to adjust the compliance of the composite gear. This may allow a more precise control over a tooth contact pressure than may be possible with the tooth flank correction.

In some embodiments, the composite web includes a plurality of rings axially stacked along the composite axial length of the composite web. The plurality of rings may include complete 360 degrees rings stacked up to achieve the required composite axial length. A random chopped strand construction may be used for less stiff rings.

In some embodiments, the composite web further includes a plurality of rings each formed from segments circumferentially abutting each other and the plurality of rings are axially stacked along the composite axial length of the composite web. The segments circumferentially abutting each other may form the plurality of rings including complete 360 degrees rings stacked up to achieve the required composite axial length.

In some embodiments, the composite web further includes a plurality of segments circumferentially abutting each other and form a continuous spiral along the composite axial length of the composite web. The plurality of segments circumferentially abutting each other may form the continuous spiral until the required composite axial length is achieved.

In some embodiments, the composite web further includes a plurality of segments circumferentially overlapping each other and axially stacked along the composite axial length of the composite web. The plurality of segments circumferentially overlapping each other may form a continuous spiral until the required composite axial length is achieved.

In some embodiments, the metallic gear rim further includes a plurality of spline teeth angularly spaced apart from each other with respect to the central axis and extending inwardly from the annular portion at the interface. Each spline tooth of the plurality of spline teeth extends at least partially and radially into the composite web with respect to the central axis.

In some embodiments, each spline tooth has a spline axial length along an axial direction with respect to the central axis. The spline axial length of each spline tooth is less than the axial length of the composite gear, such that the annular portion directly engages with the composite web at least partly along the axial length of the composite gear adjacent to each spline tooth.

In some embodiments, each spline tooth is spaced apart from each of the first axial end and the second axial end, such that the interface includes a first axial portion axially extending from the first axial end and a second axial portion axially extending from the second axial end. Each spline tooth is axially disposed between the first axial portion and the second axial portion. The annular portion directly engages with the composite web at each of the first axial portion and the second axial portion of the interface.

The composite web may have an interference fit within the metallic gear rim and the plurality of spline teeth may be positioned to aid location and torque transfer. Further, a reduction in the spline axial length may locally reduce the interface pressure where more tooth compliance is needed.

In some embodiments, the annular portion includes an interfacing surface that directly engages with the composite web at the interface. In some embodiments, a diameter of the interfacing surface relative to the central axis varies along the axial length of the composite gear.

In some embodiments, the interfacing surface of the annular portion includes a main interfacing surface portion having a uniform diameter relative to the central axis. The main interfacing surface portion is spaced apart from each of the first axial end and the second axial end. The interfacing surface of the annular portion further includes a first end interfacing surface portion axially extending from the main interfacing surface portion to the first axial end. The first end interfacing surface portion tapers from the main interfacing surface portion to the first axial end, such that a diameter of the first end interfacing surface portion relative to the central axis increases from the uniform diameter to a first increased diameter at the first axial end. The interfacing surface of the annular portion further includes a second end interfacing surface portion axially extending from the main interfacing surface portion to the second axial end. The second end interfacing surface portion tapers from the main interfacing surface portion to the second axial end, such that a diameter of the second end interfacing surface portion relative to the central axis increases from the uniform diameter to a second increased diameter at the second axial end.

In some embodiments, the first increased diameter is equal to the second increased diameter.

In some embodiments, the first end interfacing surface portion tapers linearly from the main interfacing surface portion to the first axial end.

In some embodiments, the second end interfacing surface portion tapers linearly from the main interfacing surface portion to the second axial end.

In some embodiments, the main interfacing surface portion of the interfacing surface forms an interference fit with the composite web.

The tapered first and second end interfacing surface portions may locally reduce the interface pressure where more tooth compliance is needed.

In some embodiments, the composite axial length is less than the axial length of the composite gear, such that the composite web is spaced apart from each of the first axial end and the second axial end. The composite gear further includes a first recess axially extending by a first recess length from the first axial end to a first axial side of the composite web. The composite gear further includes a second recess axially extending by a second recess length from the second axial end to a second axial side of the composite web opposite to the first axial side. The metallic gear rim does not engage with the composite web at each of the first recess and the second recess.

The first and second recesses may locally reduce the interface pressure where more tooth compliance is needed.

In some embodiments, an interface pressure at the interface between the metallic gear rim and the composite web varies along the axial length of the composite gear.

In a second aspect, there is provided a method of manufacturing the composite gear of the first aspect. The method includes varying an interface pressure at the interface between the metallic gear rim and the composite web along the axial length of the composite gear, thereby increasing a compliance of each of the plurality of gear teeth at the one or more predefined locations.

The details of one or more examples of the disclosure are set forth in the accompanying drawings and the description below. Other features, objects, and advantages of the disclosure will be apparent from the description and drawings, and from the claims.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided with upstream of the turbine(s).

The or each compressor (for example, the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example, the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1 s, 105 Nkg-1 s, 100 Nkg-1 s, 95 Nkg-1 s, 90 Nkg-1 s, 85 Nkg-1 s, or 80 Nkg-1 s. The specific thrust may be in an inclusive range bounded by any two of the values in the previous sentence (i.e. the values may form upper or lower bounds), for example in the range of from 80 Nkg-1 s to 100 Nkg-1 s, or 85 Nkg-1 s to 95 Nkg-1 s. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24, or 26 fan blades.

BRIEF DESCRIPTION OF THE DRAWINGS

Embodiments will now be described by way of example only, with reference to the Figures, in which:

FIG. 10A shows a schematic view of a composite web in accordance with an embodiment of the present disclosure;

FIG. 10B shows a schematic view of a composite web in accordance with an embodiment of the present disclosure;

FIG. 10C shows a schematic view of a composite web in accordance with an embodiment of the present disclosure;

FIG. 10D shows a schematic view of a composite web in accordance with an embodiment of the present disclosure.

DETAILED DESCRIPTION

Aspects and embodiments of the present disclosure will now be discussed with reference to the accompanying figures. Further aspects and embodiments will be apparent to those skilled in the art.

Figure 1:
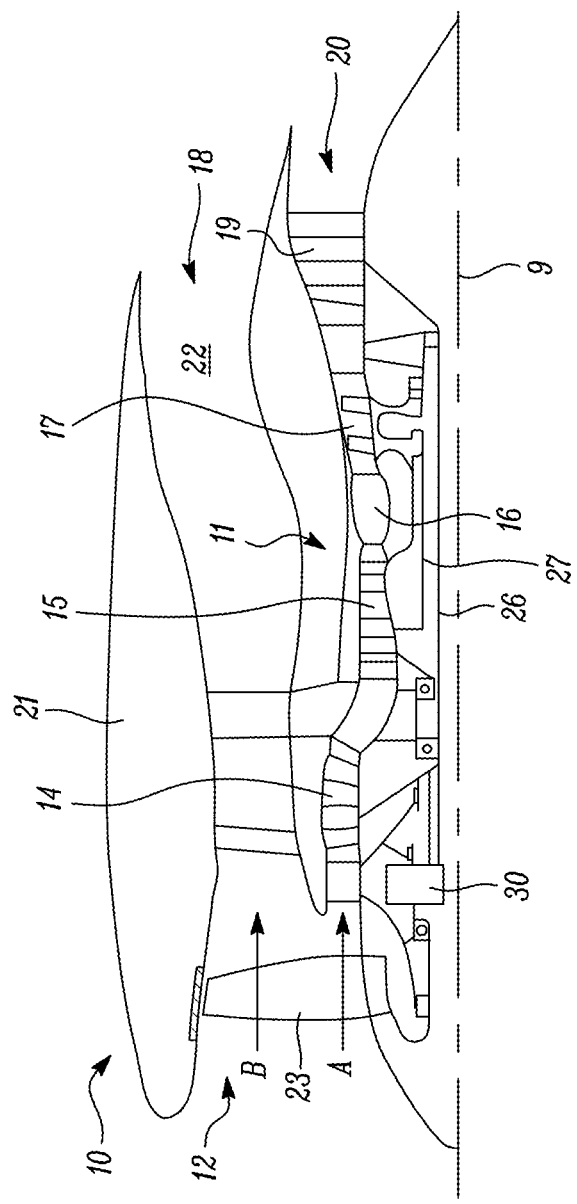
FIG. 1 shows a sectional side view of a gas turbine engine.

FIG. 1 illustrates a gas turbine engine 10 having a principal rotational axis 9. The gas turbine engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high-pressure compressor 15, combustion equipment 16, a high-pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
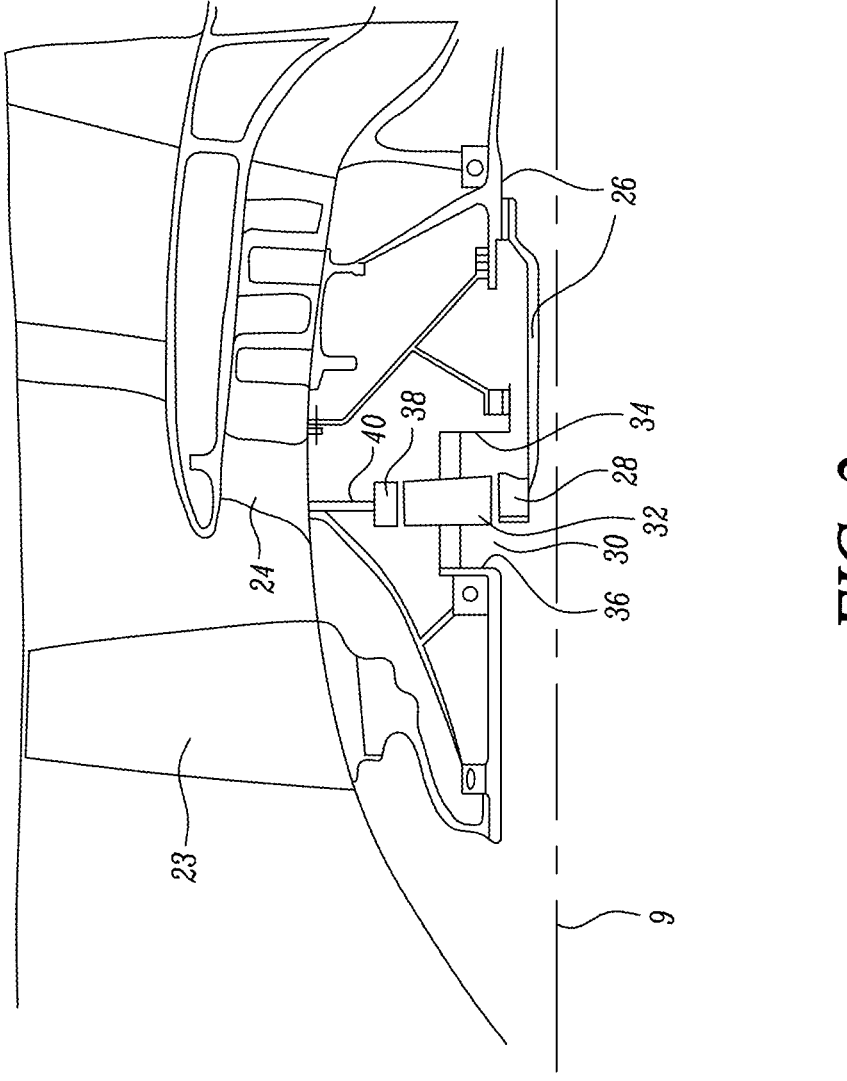
FIG. 2 shows a close-up sectional side view of an upstream portion of the gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear 28, of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
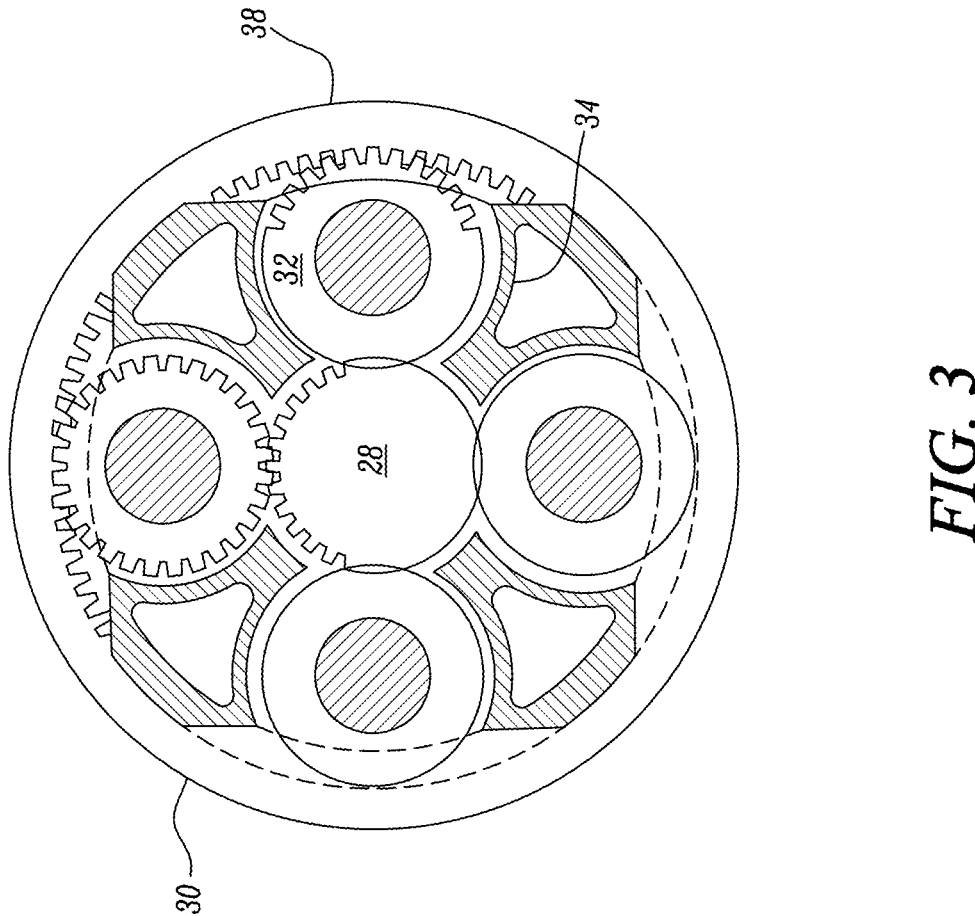
FIG. 3 shows a partially cut-away view of the gearbox of the gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIG. 2 and FIG. 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIG. 2 and FIG. 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine 10 (for example between the input and output shafts from the gearbox 30 and the fixed structures 24, such as the gearbox casing) may be used, and the disclosure is not limited to the exemplary arrangement of FIG. 2. For example, where the gearbox 30 has a star arrangement (described above), the skilled person would readily understand that the arrangement of output and support linkages 40 and bearing locations would typically be different to that shown by way of example in FIG. 2.

Accordingly, the present disclosure extends to a gas turbine engine having any arrangement of gearbox styles (for example, star or planetary), support structures, input and output shaft arrangement, and bearing locations.

Optionally, the gearbox 30 may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figures 4A, 4B:
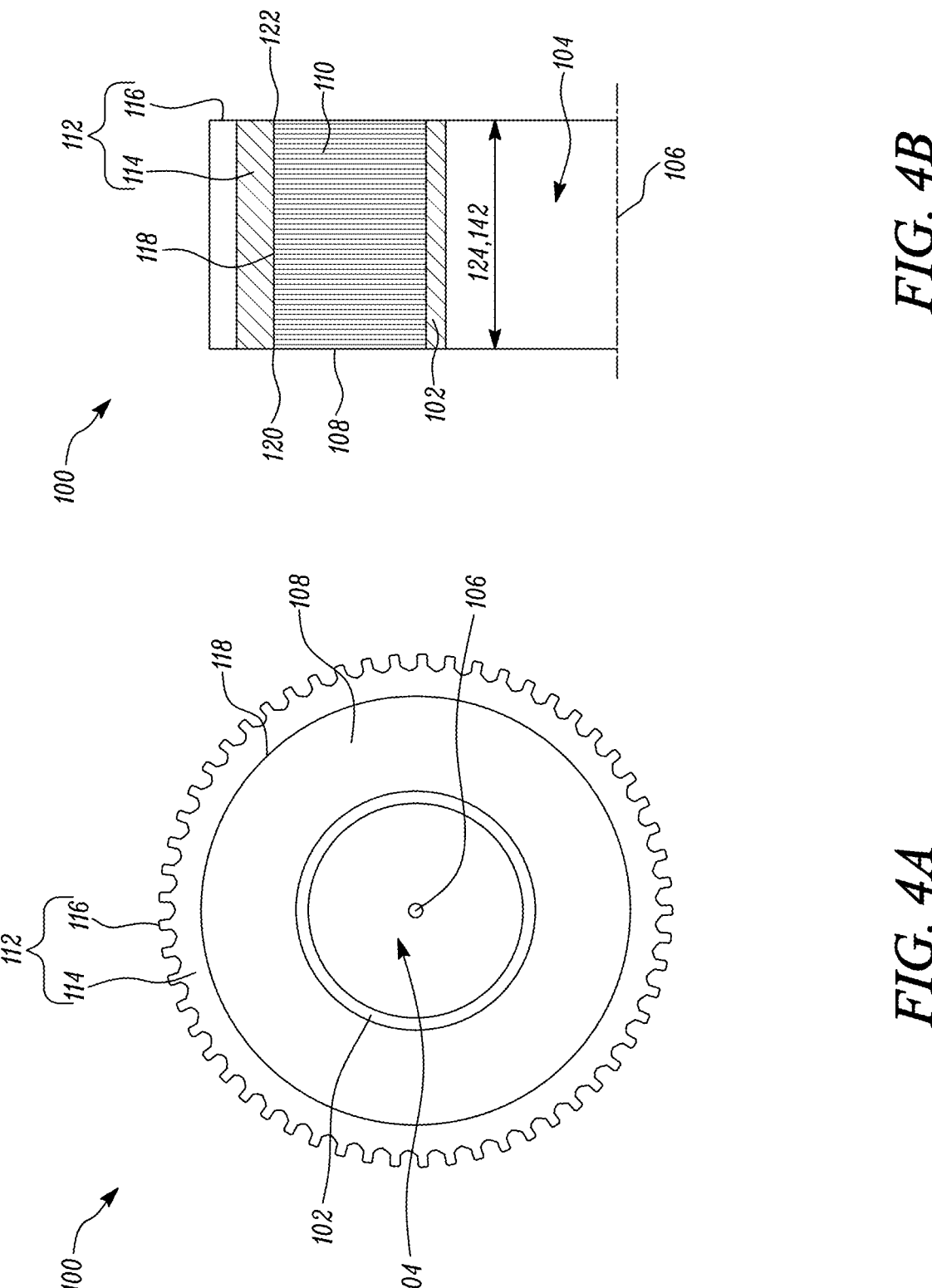
FIG. 4A shows a schematic top view of a composite gear in accordance with an embodiment of the present disclosure.
FIG. 4B shows a schematic sectional view of a portion of the composite gear.

FIG. 4A shows a schematic top view of a composite gear 100 in accordance with an embodiment of the present disclosure.

FIG. 4B shows a schematic sectional view of a portion of the composite gear 100 in accordance with an embodiment of the present disclosure.

Referring to FIGS. 4A and 4B, the composite gear 100 includes an annular metallic gear hub 102 including a bore 104 and defining a central axis 106 of the composite gear 100. The composite gear 100 may be a gear of the gas turbine engine 10 (shown in FIG. 1). The composite gear 100 may include spur gears, bevel gears, helical, and double helical gears. The composite gear 100 may further include the ring gear 38 (shown in FIG. 3), the planet gear 32 (shown in FIG. 3), or the sun gear 28 (shown in FIG. 3), such as for the epicyclic gearbox 30 (shown in FIG. 3) of the gas turbine engine 10 (shown in FIG. 1).

In an embodiment, the composite gear 100 may be made up of a composite material or a hybrid of the metal and the composite material.

The composite gear 100 further includes a composite web 108 disposed circumferentially around the annular metallic gear hub 102 with respect to the central axis 106. The composite web 108 includes the plurality of fibres 110 (shown in FIG. 4B). The composite web 108 has a composite axial length 142. In an embodiment, the composite web 108 is constructed from layers of the composite material.

The composite material may include a carbon composite or a glass fibre composite. A matrix of the composite material may include epoxy, bismaleimide (BMI), and cyanate ester.

The composite gear 100 including the composite web 108 may have a reduced mass as compared to a metallic gear.

The composite gear 100 further includes a metallic gear rim 112 disposed circumferentially around the composite web 108 with respect to the central axis 106. The metallic gear rim 112 includes an annular portion 114 disposed adjacent to the composite web 108. The metallic gear rim 112 further includes a plurality of gear teeth 116 angularly spaced apart from each other with respect to the central axis 106 and extending outwardly from the annular portion 114 distal to the composite web 108.

The composite gear 100 further includes an interface 118 disposed between the metallic gear rim 112 and the composite web 108. The metallic gear rim 112 at least partially engages with the composite web 108 at the interface 118. The interface 118 extends from a first axial end 120 to a second axial end 122 along an axial length 124 of the composite gear 100 with respect to the central axis 106. In the illustrated embodiment of FIG. 4B, the composite axial length 142 of the composite web 108 is equal to the axial length 124 of the composite gear 100.

Figures 5A, 5B, 5C:
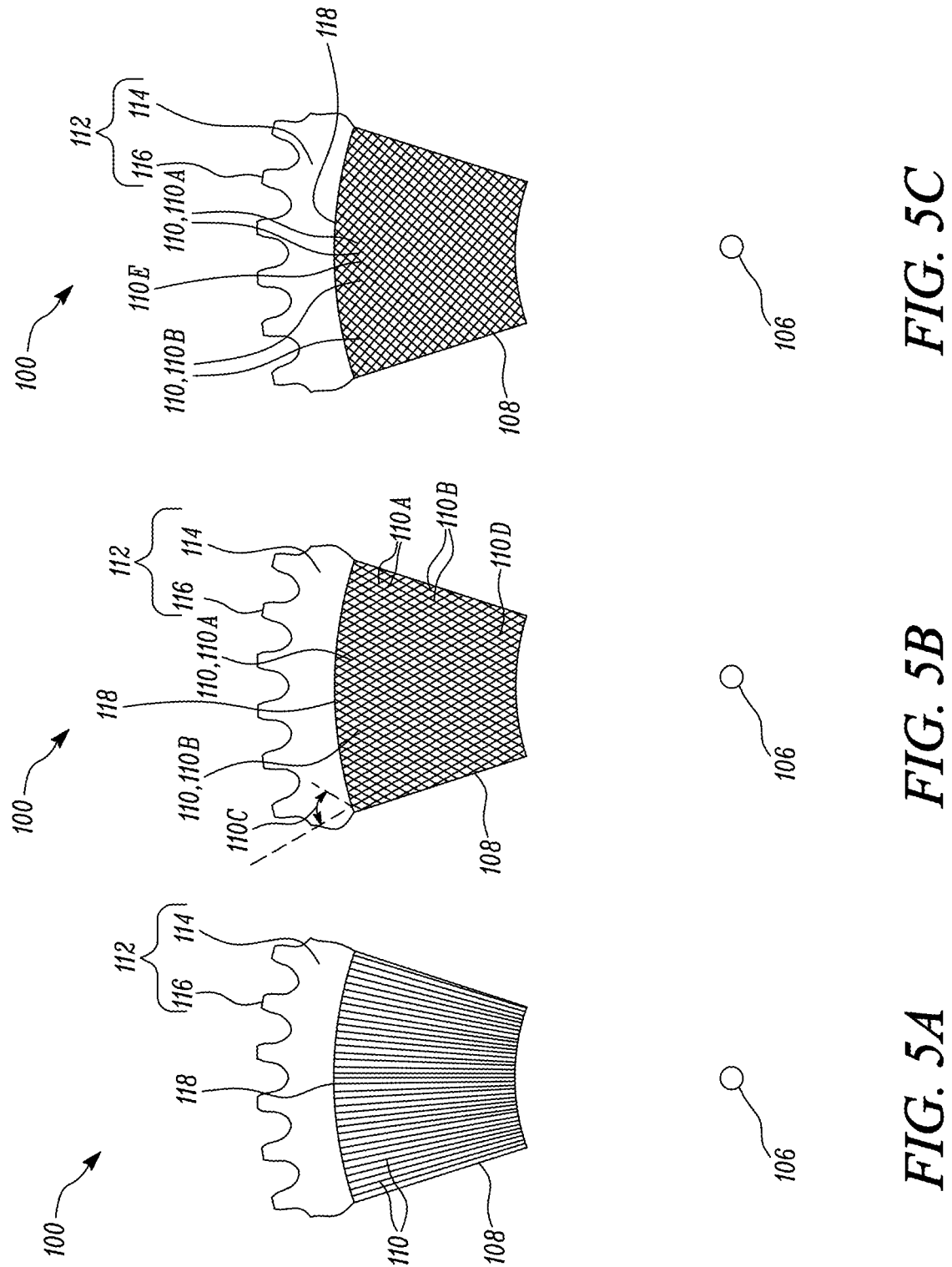
FIG. 5A shows a schematic top view of a portion of the composite gear.
FIG. 5B shows a schematic top view of a portion of the composite gear.
FIG. 5C shows a schematic top view of a portion of the composite gear.

FIGS. 5A, 5B and 5C show schematic top views of a portion of the composite gear 100 in accordance with an embodiment of the present disclosure. Specifically, FIGS. 5A, 5B and 5C show different arrangements of the plurality of fibres 110 of the composite web 108.

In the illustrated embodiment of FIG. 5A, each of the plurality of fibres 110 extends radially with respect to the central axis 106. The radial extension of the plurality of fibres 110 may provide a greater stiffness to the composite web 108.

As shown in FIGS. 5B and 5C, in an embodiment, the plurality of fibres 110 includes a set of first fibres 110A. The plurality of fibres 110 further includes a set of second fibres 110B. The set of second fibres 110B intersects with the set of first fibres 110A. The set of second fibres 110B is inclined to the set of first fibres 110A by an inclination angle 110C, such that the set of first fibres 110A and the set of second fibres 110B together form a mesh 110D (shown in FIG. 5B) or a woven fabric 110E (shown in FIG. 5C).

In the illustrated embodiment of FIG. 5B, the inclination angle 110C is from 30 degrees to 60 degrees. At such inclination angle 110C, the set of first fibres 110A and the set of second fibres 110B together form the mesh 110D.

In the illustrated embodiment of FIG. 5C, the set of first fibres 110A and the set of second fibres 110B together form the woven fabric 110E.

The inclination between the second fibres 110B and first fibres 110A (shown in FIG. 5B and FIG. 5C) may lower a stiffness of the composite web 108.

In some embodiments, the plurality of fibres 110 may be made up of a material of low modulus. The low modulus material may reduce a stiffness of the composite web 108.

Figure 6:
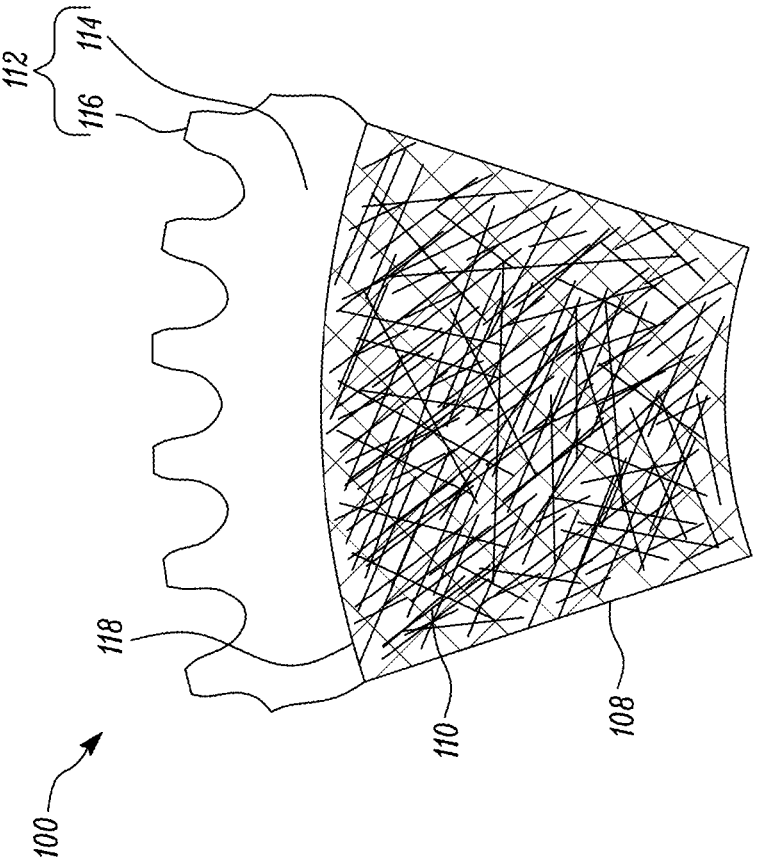
FIG. 6 shows a schematic top view of a portion of the composite gear in accordance with another embodiment of the present disclosure.
Figure 6:

FIG. 6 shows a schematic top view of a portion of the composite gear 100 in accordance with another embodiment of the present disclosure. Specifically, FIG. 6 shows another arrangement of the plurality of fibres 110 of the composite web 108.

As shown in FIG. 6, in an embodiment, the plurality of fibres 110 is randomly arranged in the composite web 108. In some embodiments, the random arrangement of the plurality of fibres 110 within the composite web 108 may have a random chopped strand construction. The random arrangement of the plurality of fibres 110 may reduce a stiffness of the composite web 108.

Figure 7:
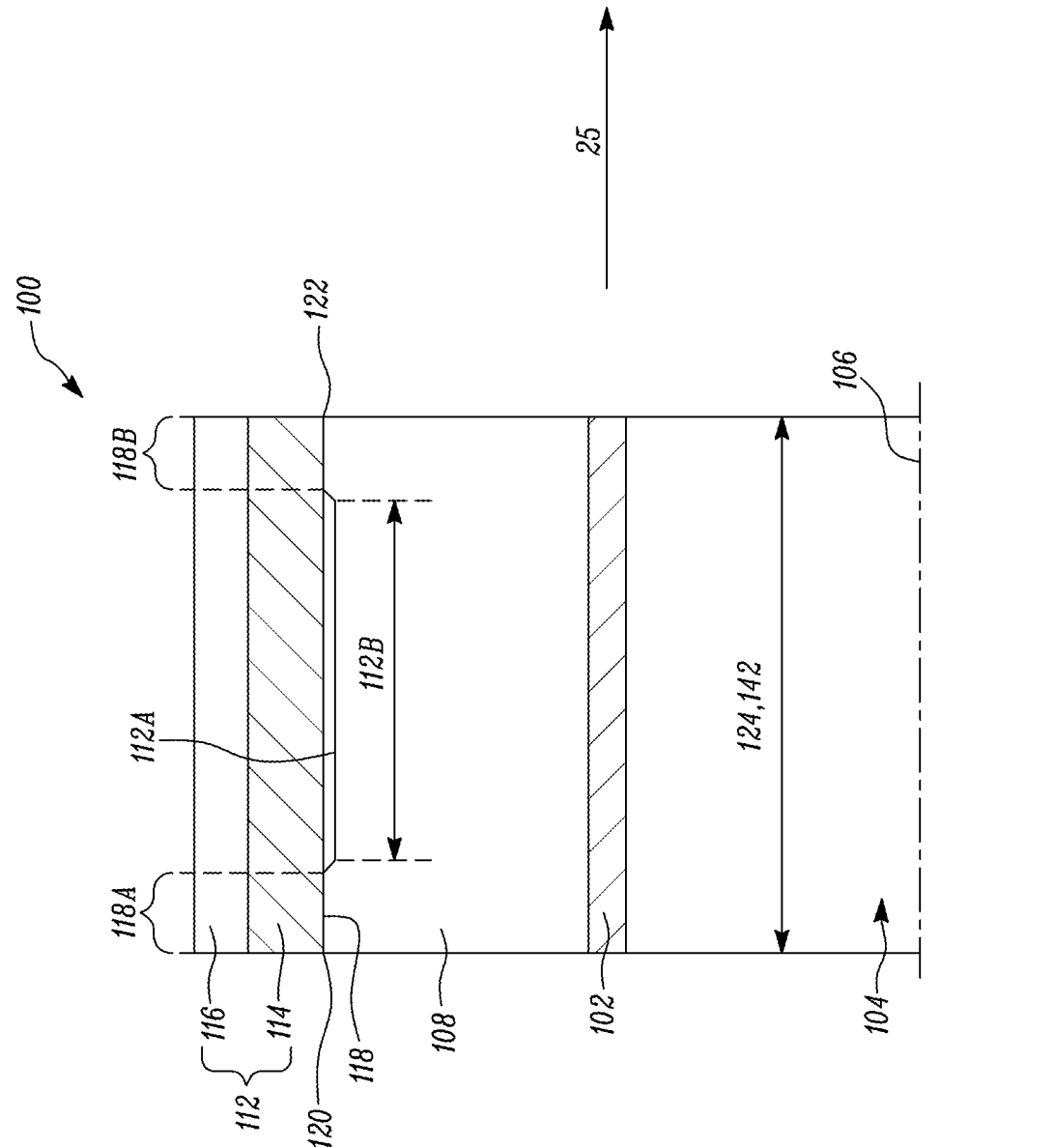
FIG. 7 shows a schematic sectional view of a portion of the composite gear in accordance with another embodiment of the present disclosure.

FIG. 7 shows a schematic sectional view of a portion of the composite gear 100 in accordance with another embodiment of the present disclosure.

In the illustrated embodiment of FIG. 7, the metallic gear rim 112 further includes a plurality of spline teeth 112A angularly spaced apart from each other with respect to the central axis 106 and extending inwardly from the annular portion 114 at the interface 118. Each spline tooth 112A of the plurality of spline teeth 112A extends at least partially and radially into the composite web 108 with respect to the central axis 106.

In an embodiment, each spline tooth 112A has a spline axial length 112B along an axial direction 25 with respect to the central axis 106. The spline axial length 112B of each spline tooth 112A is less than the axial length 124 of the composite gear 100, such that the annular portion 114 directly engages with the composite web 108 at least partly along the axial length 124 of the composite gear 100 adjacent to each spline tooth 112A.

In an embodiment, each spline tooth 112A is spaced apart from each of the first axial end 120 and the second axial end 122, such that the interface 118 includes a first axial portion 118A axially extending from the first axial end 120 and a second axial portion 118B axially extending from the second axial end 122. Each spline tooth 112A is axially disposed between the first axial portion 118A and the second axial portion 118B. The annular portion 114 directly engages with the composite web 108 at each of the first axial portion 118A and the second axial portion 118B of the interface 118.

A reduction in the spline axial length 112B of the spline teeth 112A may reduce an interface pressure, and thereby may locally reduce the interface pressure where more tooth compliance is needed (e.g., at each of the first axial portion 118A and the second axial portion 118B of the interface 118).

The splined teeth 112A in the metallic gear rim 112 (shown in FIG. 7) may be positioned to aid location and torque transfer.

Further, in the illustrated embodiment of FIG. 7, the composite axial length 142 of the composite web 108 is equal to the axial length 124 of the composite gear 100.

Figure 8:
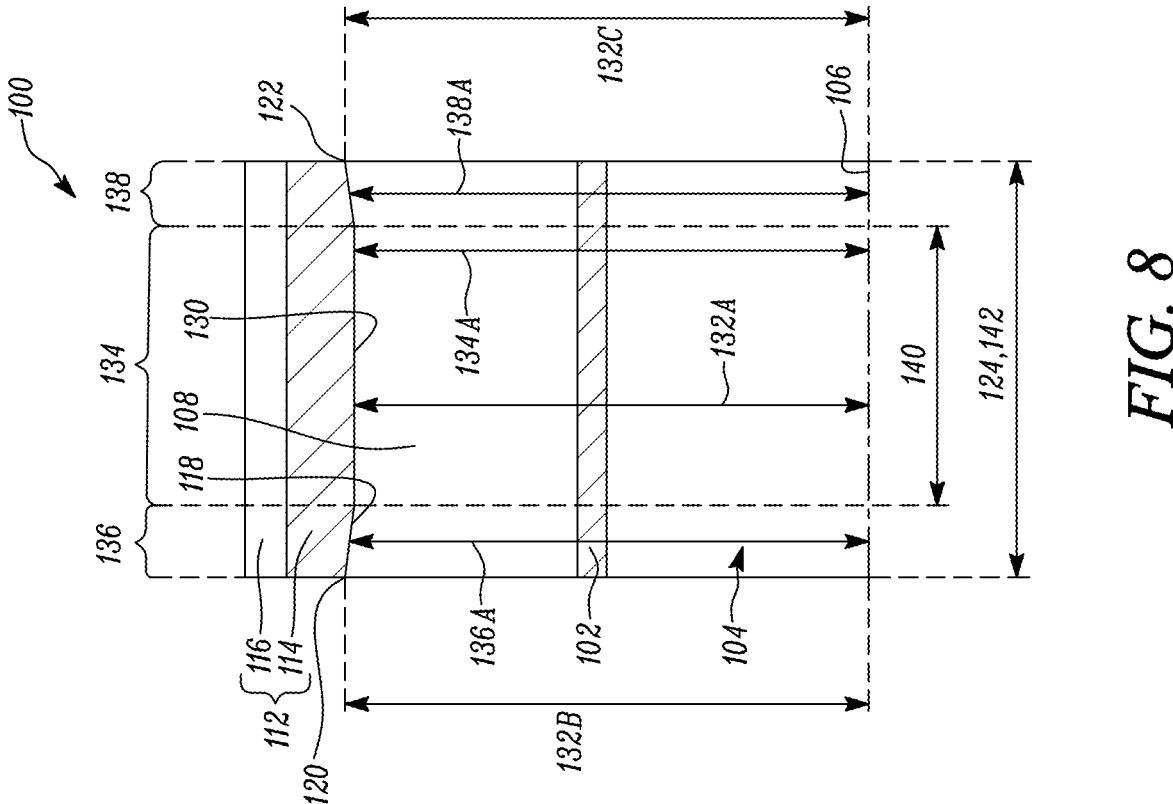
FIG. 8 shows a schematic sectional view of a portion of the composite gear in accordance with another embodiment of the present disclosure.

FIG. 8 shows a schematic sectional view of a portion of the composite gear 100 in accordance with another embodiment of the present disclosure.

In the illustrated embodiment of FIG. 8, the annular portion 114 includes an interfacing surface 130 that directly engages with the composite web 108 at the interface 118. In an embodiment, a diameter 132A of the interfacing surface 130 relative to the central axis 106 varies along the axial length 124 of the composite gear 100.

In an embodiment, the interfacing surface 130 of the annular portion 114 includes a main interfacing surface portion 134 having a uniform diameter 134A relative to the central axis 106. The main interfacing surface portion 134 is spaced apart from each of the first axial end 120 and the second axial end 122.

The interfacing surface 130 of the annular portion 114 further includes a first end interfacing surface portion 136 axially extending from the main interfacing surface portion 134 to the first axial end 120.

In some embodiments, the first end interfacing surface portion 136 tapers from the main interfacing surface portion 134 to the first axial end 120, such that a diameter 136A of the first end interfacing surface portion 136 relative to the central axis 106 increases from the uniform diameter 134A to a first increased diameter 132B at the first axial end 120. In an embodiment, the first end interfacing surface portion 136 tapers linearly from the main interfacing surface portion 134 to the first axial end 120.

The interfacing surface 130 of the annular portion 114 further includes a second end interfacing surface portion 138 axially extending from the main interfacing surface portion 134 to the second axial end 122.

In some embodiments, the second end interfacing surface portion 138 tapers from the main interfacing surface portion 134 to the second axial end 122, such that a diameter 138A of the second end interfacing surface portion 138 relative to the central axis 106 increases from the uniform diameter 134A to a second increased diameter 132C at the second axial end 122. In an embodiment, the second end interfacing surface portion 138 tapers linearly from the main interfacing surface portion 134 to the second axial end 122.

In the illustrated embodiment of FIG. 8, the first increased diameter 132B is equal to the second increased diameter 132C.

In an embodiment, the main interfacing surface portion 134 of the interfacing surface 130 forms the interference fit 140 with the composite web 108.

The tapered first and second end interfacing surface portions 136, 138 may locally reduce the interface pressure where more tooth compliance is needed.

Further, in the illustrated embodiment of FIG. 8, the composite axial length 142 of the composite web 108 is equal to the axial length 124 of the composite gear 100.

Figure 9:
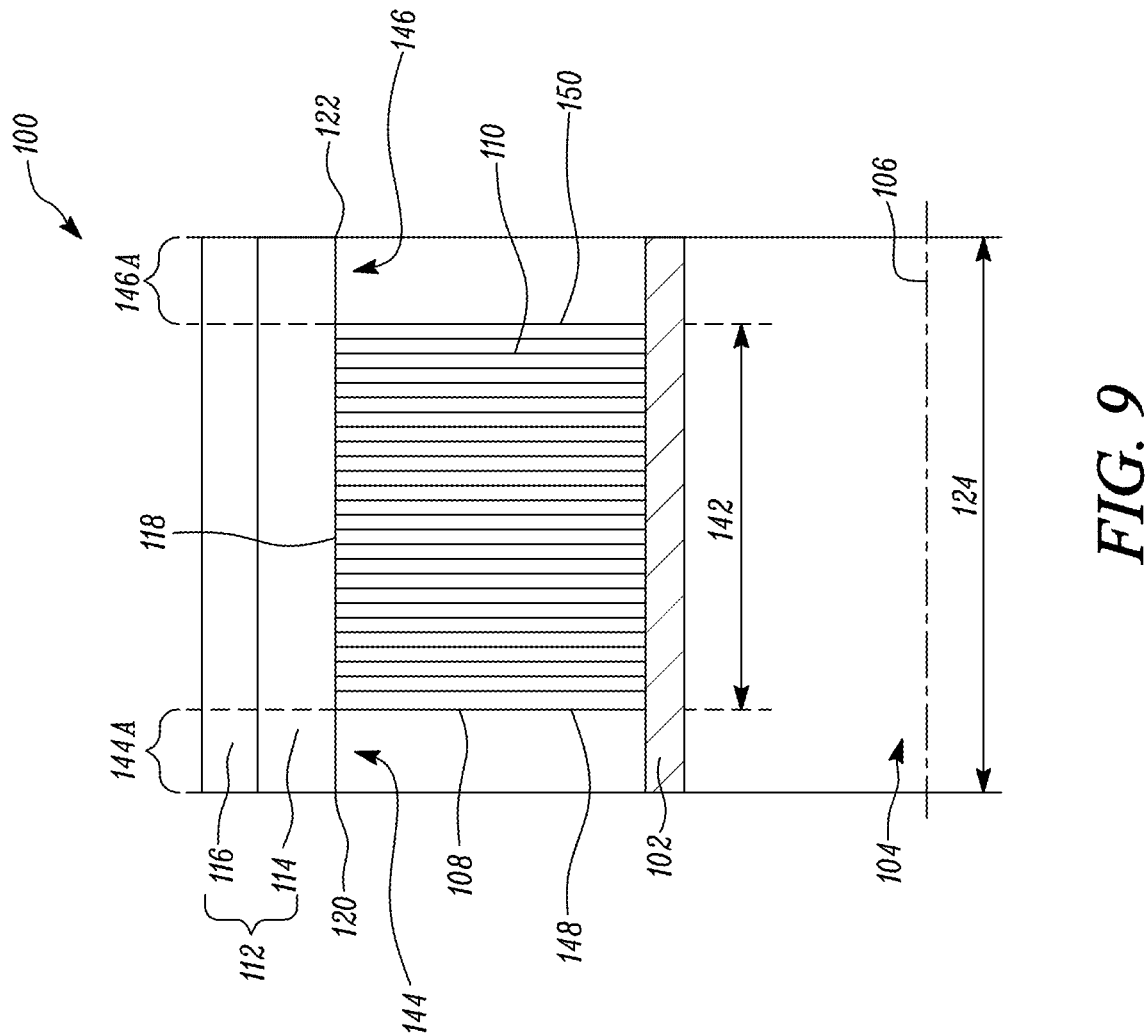
FIG. 9 shows a schematic sectional view of a portion of the composite gear in accordance with another embodiment of the present disclosure.

FIG. 9 shows a schematic sectional view of a portion of the composite gear 100 in accordance with another embodiment of the present disclosure.

In the illustrated embodiment of FIG. 9, the composite axial length 142 is less than the axial length 124 of the composite gear 100, such that the composite web 108 is spaced apart from each of the first axial end 120 and the second axial end 122.

In some embodiments, the composite gear 100 includes a first recess 144 axially extending by a first recess length 144A from the first axial end 120 to a first axial side 148 of the composite web 108.

In some embodiments, the composite gear 100 further includes a second recess 146 axially extending by a second recess length 146A from the second axial end 122 to a second axial side 150 of the composite web 108 opposite to the first axial side 148.

In such embodiments, the metallic gear rim 112 does not engage with the composite web 108 at each of the first recess 144 and the second recess 146. The first and second recesses 144, 146 may locally reduce the interface pressure where more tooth compliance is needed.

Referring to FIGS. 4A, 4B, 7, 8 and 9, in some embodiments, an interface pressure at the interface 118 between the metallic gear rim 112 and the composite web 108 varies along the axial length 124 of the composite gear 100.

The composite gear 100 may provide an improved compliance to minimize a need for any gear tooth flank correction. A defined variation in the interface pressure and stiffness of the composite web 108 underneath the metallic rim 112 and along the axial length 124 of the composite gear 100 may increase the compliance in each gear tooth 116 at predefined locations. The increased compliance may locally reduce the gear tooth contact pressure and thereby may replicate on the composite gear 100. This may provide similar effects of the gear tooth flank correction. Specifically, a pressure at the interface between the composite web 108 and the metallic gear rim 112 combined with the stiffness of the composite web 108 may provide a significant contribution to a bending stiffness of the metallic gear rim 112. A less stiffly supported metallic gear rim 112 may provide the gear teeth 116 more compliance under an application of a load. More compliance may reduce the gear tooth contact pressure and a resulting strain in a root radius of the composite gear 100. Since, the gear tooth flank correction may be no longer required, the composite gear 100 may be manufactured using more cost-effective machine tools and machining methods. Therefore, the composite gear 100 may be manufactured with an improved compliance and may have a reduced manufacturing cost. Further, as the composite gear 100 may have the improved compliance without permanent alterations to the gear teeth 116 for a particular use condition, the composite gear 100 may be used effectively over varying use conditions.

In an embodiment, a method of manufacturing the composite gear 100 includes varying the interface pressure at the interface 118 between the metallic gear rim 112 and the composite web 108 along the axial length 124 of the composite gear 100, thereby increasing a compliance of each of the plurality of gear teeth 116 at one or more predefined locations.

FIGS. 10A, 10B, 10C and 10D show schematic views of the composite web 108 in accordance with an embodiment of the present disclosure.

Referring to FIG. 10A, in an embodiment, the composite web 108 includes a composite web 108A. The composite web 108A includes a plurality of rings 126A axially stacked along the composite axial length 142 of the composite web 108.

Referring to FIG. 10B, the composite web 108 includes a composite web 108B. The composite web 108B includes a plurality of rings 126B each formed from segments 128A circumferentially abutting each other and the plurality of rings 126B are axially stacked along the composite axial length 142 of the composite web 108.

Referring to FIG. 10C, the composite web 108 includes a composite web 108C. The composite web 108C further includes a plurality of segments 128B circumferentially abutting each other and form a continuous spiral 152 along the composite axial length 142 of the composite web 108.

Referring to FIG. 10D, the composite web 108 includes a composite web 108D. The composite web 108D further includes a plurality of segments 128C circumferentially overlapping each other and axially stacked along the axial length 142 of the composite web 108.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A composite gear comprising:

an annular metallic gear hub comprising a bore and defining a central axis of the composite gear;

a composite web disposed circumferentially around the annular metallic gear hub with respect to the central axis, the composite web comprising a plurality of fibres, wherein the composite web has a composite axial length;

a metallic gear rim disposed circumferentially around the composite web with respect to the central axis, the metallic gear rim comprising:

an annular portion disposed adjacent to the composite web; and a plurality of gear teeth angularly spaced apart from each other with respect to the central axis and extending outwardly from the annular portion distal to the composite web; and an interface disposed between the metallic gear rim and the composite web, the metallic gear rim at least partially engaging with the composite web at the interface, and the interface extending from a first axial end to a second axial end along an portion of an axial length of the composite gear with respect to the central axis where the metallic gear rim and the composite web interface;

wherein the plurality of fibres of the composite web comprises: a set of first fibres; and a set of second fibres intersecting with the set of first fibres and inclined to the set of first fibres by an inclination angle from 30 degrees to 60 degrees, such that the set of first fibres and the set of second fibres together form a mesh or a woven fabric; and wherein the annular portion comprises an interfacing surface that directly engages with the composite web at the interface, and wherein a diameter of the interfacing surface relative to the central axis varies along the axial length of the composite gear.

2. The composite gear of claim 1, wherein each of the plurality of fibres extends radially with respect to the central axis.

3. The composite gear of claim 1, wherein the composite web comprises a plurality of rings axially stacked along the composite axial length of the composite web.

4. The composite gear of claim 1, wherein the composite web comprises a plurality of rings each formed from segments circumferentially abutting each other and the plurality of rings are axially stacked along the composite axial length of the composite web.

5. The composite gear of claim 1, wherein the composite web comprises a plurality of segments circumferentially abutting each other and form a continuous spiral along the composite axial length of the composite web.

6. The composite gear of claim 1, wherein the composite web comprises a plurality of segments circumferentially overlapping each other and axially stacked along the composite axial length of the composite web.

7. The composite gear of claim 1, wherein the metallic gear rim further comprises a plurality of spline teeth angularly spaced apart from each other with respect to the central axis and extending inwardly from the annular portion, and wherein each spline tooth of the plurality of spline teeth extends at least partially and radially into the composite web with respect to the central axis, forming a portion of the interface.

8. The composite gear of claim 7, wherein each spline tooth has a spline axial length along an axial direction with respect to the central axis, and wherein the spline axial length of each spline tooth is less than the axial length of the composite gear, such that the annular portion directly engages with the composite web at least partly along the axial length of the composite gear adjacent to each spline tooth.

9. The composite gear of claim 8, wherein each spline tooth is spaced apart from each of the first axial end and the second axial end, such that the interface comprises a first axial portion axially extending from the first axial end and a second axial portion axially extending from the second axial end, wherein each spline tooth is axially disposed between the first axial portion and the second axial portion, and wherein the annular portion directly engages with the composite web at each of the first axial portion and the second axial portion of the interface.

10. The composite gear of claim 1, wherein the interfacing surface of the annular portion comprises:

a main interfacing surface portion having a uniform diameter relative to the central axis, wherein the main interfacing surface portion is spaced apart from each of the first axial end and the second axial end;

a first end interfacing surface portion axially extending from the main interfacing surface portion to the first axial end, wherein the first end interfacing surface portion tapers from the main interfacing surface portion to the first axial end, such that a diameter of the first end interfacing surface portion relative to the central axis increases from the uniform diameter to a first increased diameter at the first axial end; and a second end interfacing surface portion axially extending from the main interfacing surface portion to the second axial end, wherein the second end interfacing surface portion tapers from the main interfacing surface portion to the second axial end, such that a diameter of the second end interfacing surface portion relative to the central axis increases from the uniform diameter to a second increased diameter at the second axial end.

11. The composite gear of claim 10, wherein the first increased diameter is equal to the second increased diameter.

12. The composite gear of claim 10, wherein the first end interfacing surface portion tapers linearly from the main interfacing surface portion to the first axial end.

13. The composite gear of claim 10, wherein the second end interfacing surface portion tapers linearly from the main interfacing surface portion to the second axial end.

14. The composite gear of claim 10, wherein the main interfacing surface portion of the interfacing surface forms an interference fit with the composite web.

15. The composite gear of claim 1, wherein the composite axial length is less than the axial length of the composite gear, such that the composite web is spaced apart from each of the first axial end and the second axial end, wherein the composite gear further comprises:

a first recess axially extending by a first recess length from the first axial end to a first axial side of the composite web; and a second recess axially extending by a second recess length from the second axial end to a second axial side of the composite web opposite to the first axial side; and wherein the metallic gear rim does not engage with the composite web at each of the first recess and the second recess.

16. The composite gear of claim 1, wherein an interface pressure at the interface between the metallic gear rim and the composite web varies along the axial length of the composite gear.

17. A method of manufacturing the composite gear of claim 1, the method comprising varying an interface pressure at the interface between the metallic gear rim and the composite web along the axial length of the composite gear, thereby increasing a compliance of each of the plurality of gear teeth at one or more predefined locations.

18. A composite gear comprising:

an annular metallic gear hub comprising a bore and defining a central axis of the composite gear;

a composite web disposed circumferentially around the annular metallic gear hub with respect to the central axis, the composite web comprising a plurality of fibres, wherein the composite web has a composite axial length;

a metallic gear rim disposed circumferentially around the composite web with respect to the central axis, the metallic gear rim comprising:

an annular portion disposed adjacent to the composite web; and a plurality of gear teeth angularly spaced apart from each other with respect to the central axis and extending outwardly from the annular portion distal to the composite web; and an interface disposed between the metallic gear rim and the composite web, the metallic gear rim at least partially engaging with the composite web at the interface, and the interface extending from a first axial end to a second axial end along a portion of an axial length of the composite gear with respect to the central axis where the metallic gear rim and the composite web interface;

wherein the plurality of fibres of the composite web comprises: a set of first fibres; and a set of second fibres intersecting with the set of first fibres and inclined to the set of first fibres by an inclination angle from 30 degrees to 60 degrees, such that the set of first fibres and the set of second fibres together form a mesh or a woven fabric; and wherein the composite web comprises a plurality of rings each formed from segments circumferentially abutting each other and the plurality of rings are axially stacked along the composite axial length of the composite web.

19. A composite gear comprising:

an annular metallic gear hub comprising a bore and defining a central axis of the composite gear;

a composite web disposed circumferentially around the annular metallic gear hub with respect to the central axis, the composite web comprising a plurality of fibres, wherein the composite web has a composite axial length;

a metallic gear rim disposed circumferentially around the composite web with respect to the central axis, the metallic gear rim comprising:

an annular portion disposed adjacent to the composite web; and a plurality of gear teeth angularly spaced apart from each other with respect to the central axis and extending outwardly from the annular portion distal to the composite web; and an interface disposed between the metallic gear rim and the composite web, the metallic gear rim at least partially engaging with the composite web at the interface, and the interface extending from a first axial end to a second axial end along a portion of an axial length of the composite gear with respect to the central axis where the metallic gear rim and the composite web interface;

wherein the plurality of fibres of the composite web comprises: a set of first fibres; and a set of second fibres intersecting with the set of first fibres and inclined to the set of first fibres by an inclination angle from 30 degrees to 60 degrees, such that the set of first fibres and the set of second fibres together form a mesh or a woven fabric; and wherein the composite web comprises a plurality of segments circumferentially abutting each other and form a continuous spiral along the composite axial length of the composite web.

* * * * *